Aug. 4, 1953 W. A. PARSONS ET AL 2,647,687
CALCULATING MACHINE
Filed May 8, 1951 7 Sheets-Sheet 1

INVENTORS,
Wharton A. Parsons,
BY  Richard E. Busch

ATTORNEY.

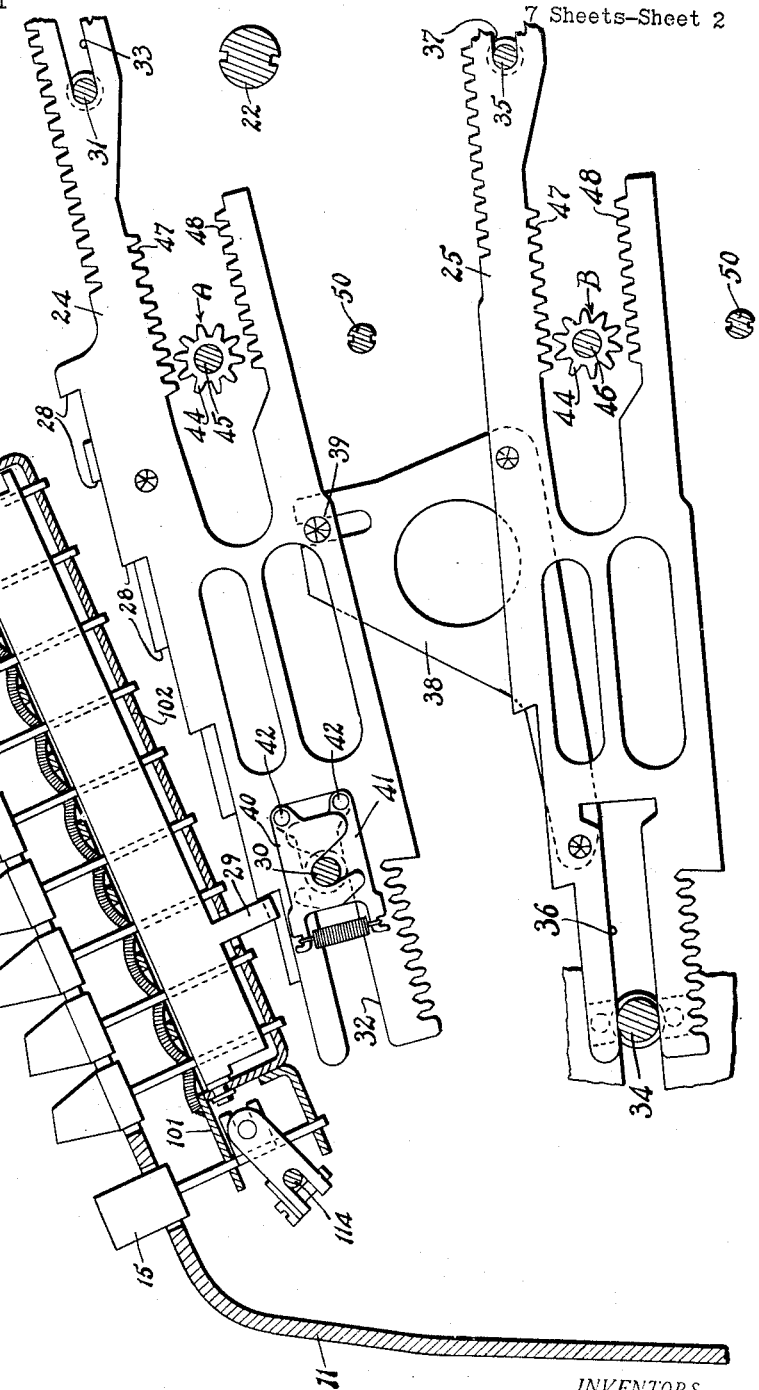

Aug. 4, 1953  W. A. PARSONS ET AL  2,647,687
CALCULATING MACHINE
Filed May 8, 1951  7 Sheets-Sheet 3
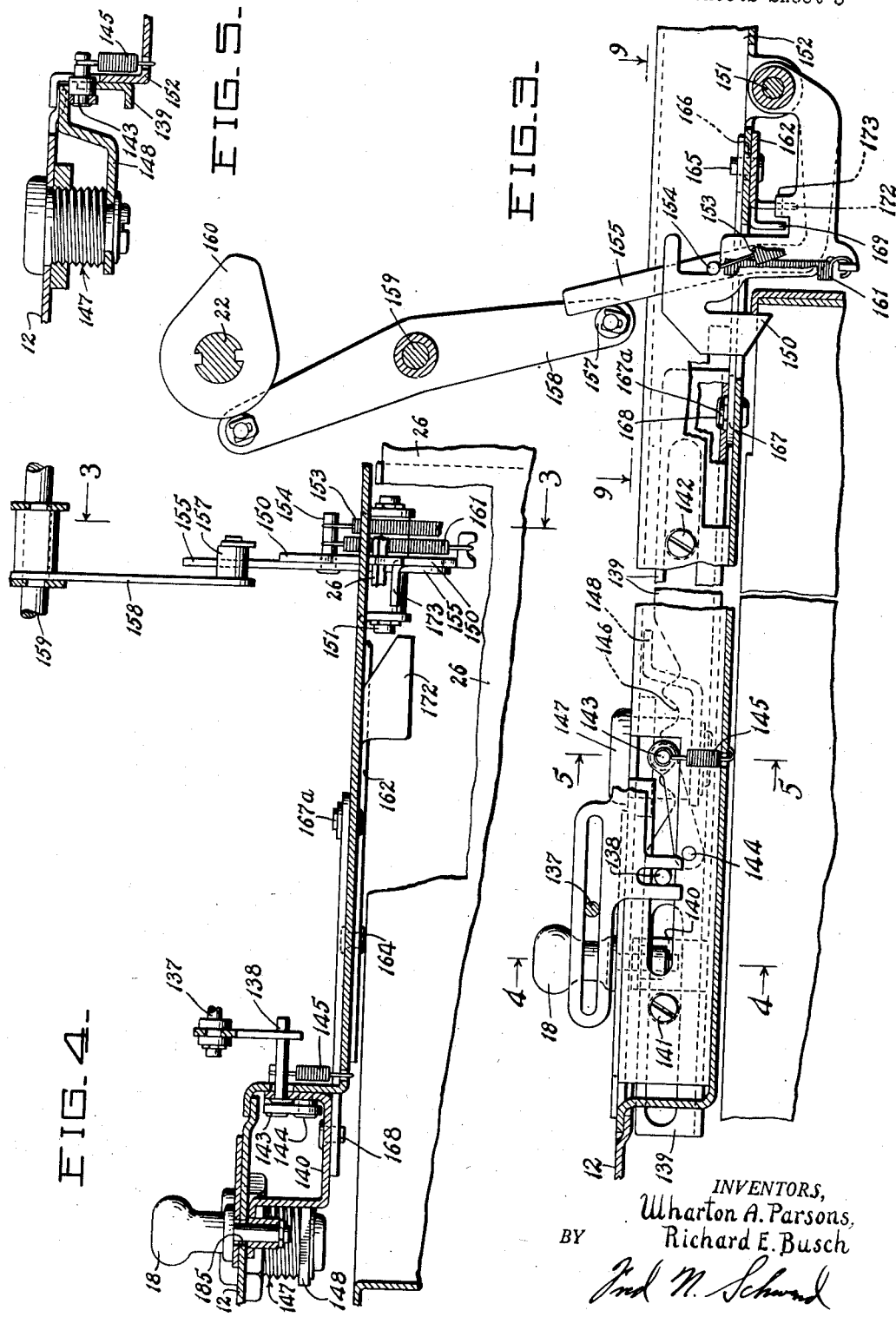
INVENTORS,
Wharton A. Parsons,
Richard E. Busch
BY
Fred N. Schwend
ATTORNEY.

Aug. 4, 1953
W. A. PARSONS ET AL
2,647,687
CALCULATING MACHINE
Filed May 8, 1951
7 Sheets-Sheet 4
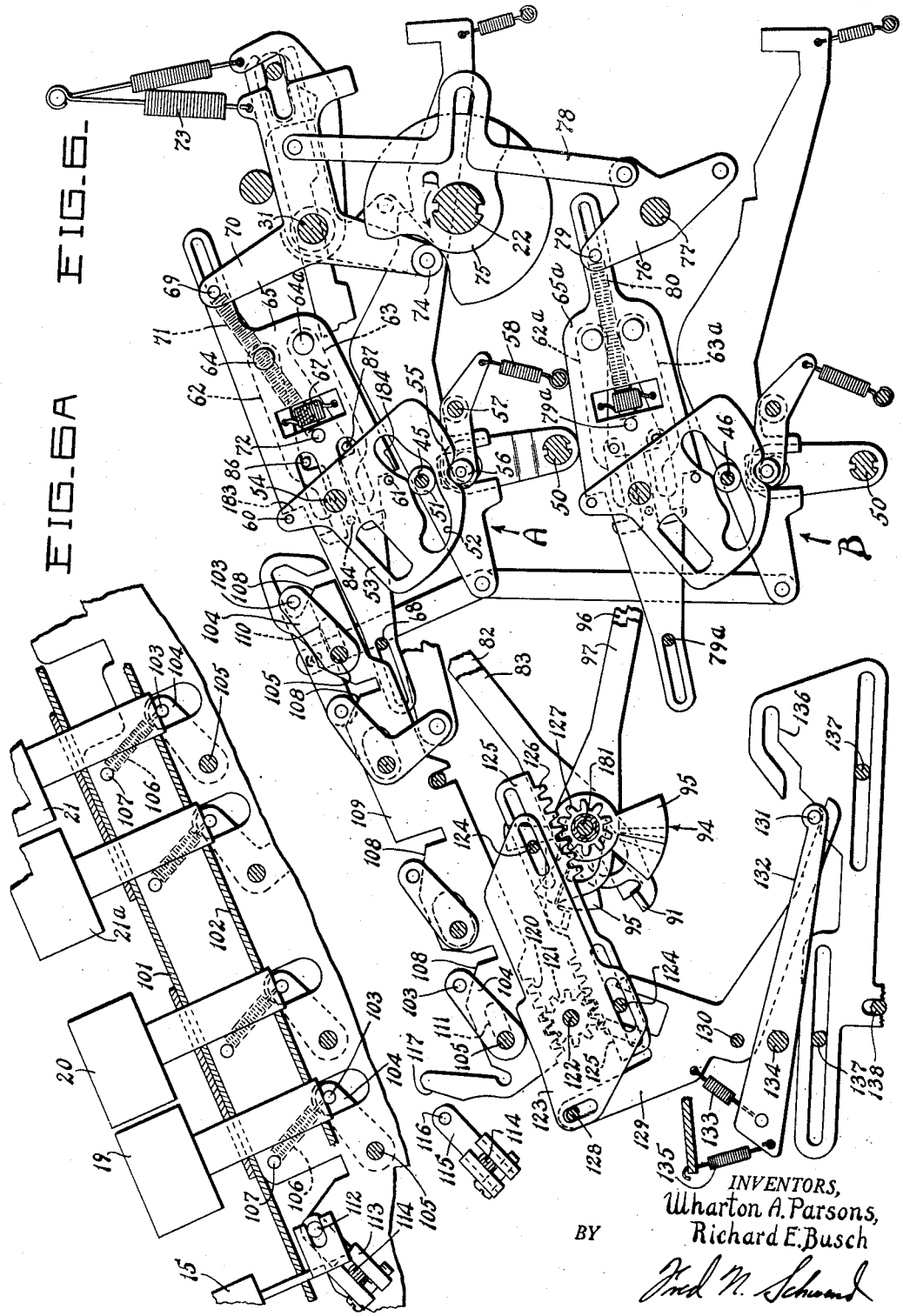
INVENTORS,
Wharton A. Parsons,
Richard E. Busch
BY
Fred N. Schwend
ATTORNEY

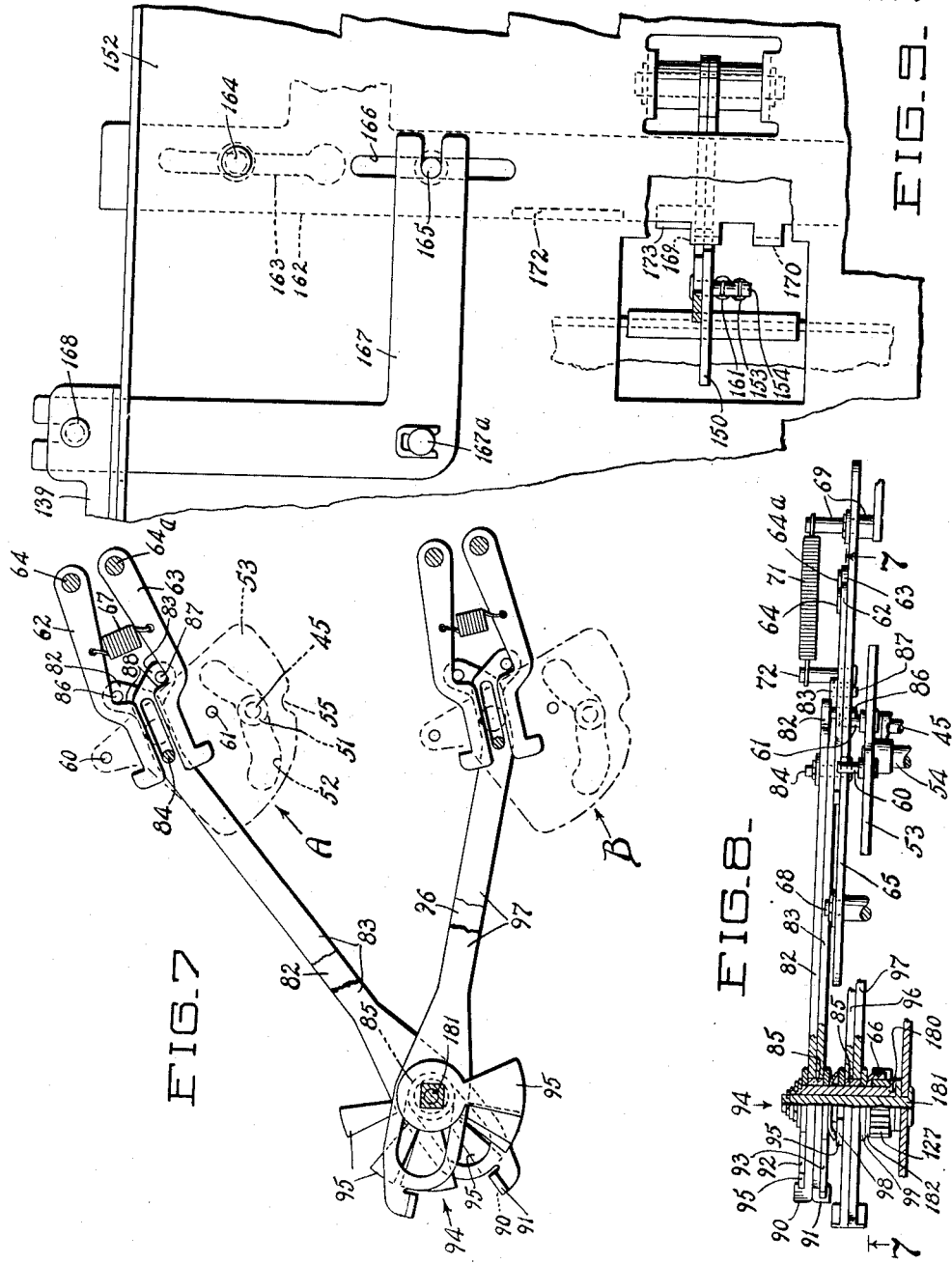

Aug. 4, 1953
W. A. PARSONS ET AL
2,647,687
CALCULATING MACHINE
Filed May 8, 1951
7 Sheets-Sheet 6
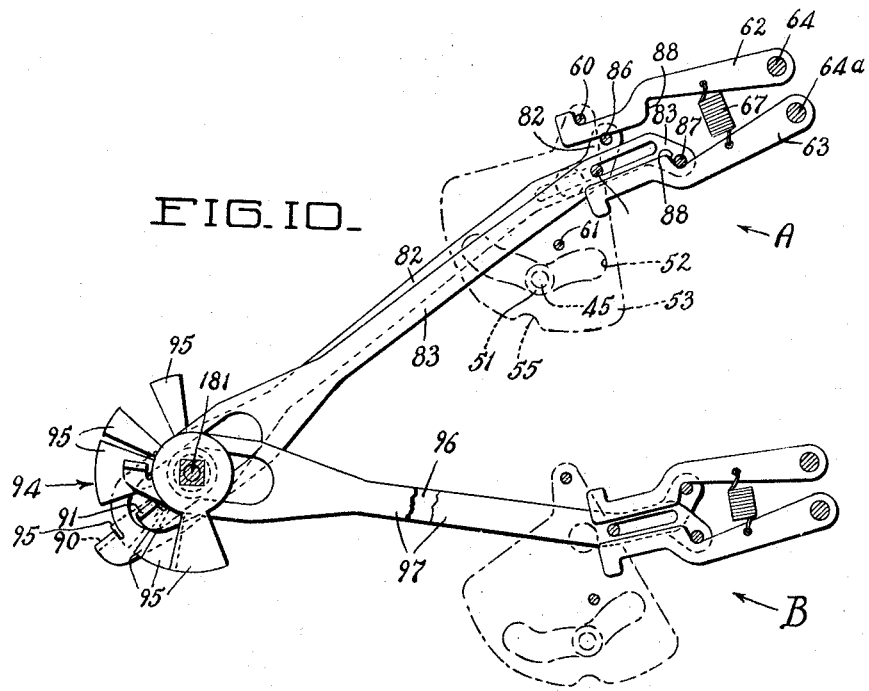
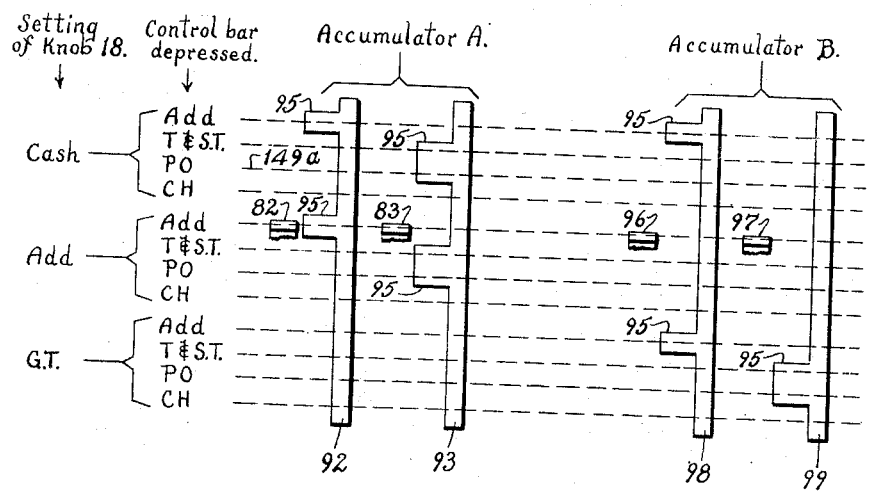
INVENTORS,
Wharton A. Parsons,
Richard E. Busch
BY
ATTORNEY.

Aug. 4, 1953 W. A. PARSONS ET AL 2,647,687
CALCULATING MACHINE
Filed May 8, 1951 7 Sheets-Sheet 7

INVENTORS,
Wharton A. Parsons,
Richard E. Busch
BY
Fred N. Schwend
ATTORNEY.

Patented Aug. 4, 1953

2,647,687

UNITED STATES PATENT OFFICE 2,647,687

CALCULATING MACHINE

Wharton A. Parsons, Glendale, and Richard E. Busch, El Monte, Calif., assignors to Clary Multiplier Corporation, San Gabriel, Calif., a corporation of California Application May 8, 1951, Serial No. 225,092

18 Claims. (Cl. 235—60)

This invention relates to the class of calculating machines, such as adding machines, cash registering machines, etc., wherein an accumulator is driven in different manners by differential actuators therefor whereby to selectively enter amounts additively or subtractively.

Although the invention is particularly applicable to machines of the above type having a plurality of accumulators and controls therefor, at least certain of the basic features of the invention may be applied to controls for a single accumulator.

The principal object of the present invention is to increase the flexibility of controls for selecting accumulators and for selecting the type of digitation of each accumulator.

Another object is to reduce the pressure required to depress accumulator selecting and type of operation control keys.

Another object is to provide controls for a multi-accumulator machine of the foregoing type having provision for preselectively determining the entry and type of entry into a selected one or more accumulators.

Another object is to enable setting of an accumulator into any of three positions relative to actuators therefor under control of elements settable into either of two positions only.

The manner in which the above and other objects of the invention are accomplished will be readily understood on reference to the following specification when read in conjunction with the accompanying drawings, wherein:

Fig. 2 is a sectional elevation view through the machine illustrating the racks, keyboard and mechanism associated therewith.

Fig. 3 is a sectional view illustrating the settable machine control knob and controls actuated thereby, and also the cash drawer control mechanism, said view being taken substantially along the line 3—3 of Fig. 4.

Fig. 4 is a transverse sectional view of part of the machine, illustrating the settable control knob and cash drawer control mechanism, and is taken substantially along the line 4—4 of Fig. 3.

Fig. 5 is a sectional view illustrating the key lock controls and is taken along the line 5—5 of Fig. 3.

Fig. 6 is a sectional elevation view through the controls for the machine and particularly the controls for selecting the accumulators and type of operation of the accumulators.

Fig. 6A is a sectional elevation view illustrating the various machine control bars and related devices.

Fig. 7 is a sectional view of the accumulator controls and is taken substantially along the line 7—7 of Fig. 8.

Fig. 8 is a fragmentary plan view of the accumulator controls.

Fig. 9 is a plan view, with parts broken away, illustrating the cash drawer control mechanism.

Fig. 10 is a sectional view, similar to that of Fig. 7, illustrating the accumulator controls in actuated positions.

Fig. 11 is a schematic view illustrating the accumulator control discs in developed form and the relation between such discs and the accumulator control links.

The particular embodiment of the invention disclosed herein is applied to the well-known and commercially available Clary cash registering machine which is disclosed and claimed in its basic form in the copending application of R. E. Boyden et al., S. N. 38,294, filed July 12, 1948, now Patent No. 2,607,526. Various operating instrumentalities of the machine, particularly of the computing section, are disclosed and claimed in the patent to R. E. Boyden, No. 2,583,810, issued on January 29, 1952, and in the patent to E. P. Drake, No. 2,472,696, issued on June 7, 1949, the latter disclosing and claiming the particular accumulator structure illustrated herein. It should be understood, however, that although the invention is disclosed as embodied in a cash registering machine of the duplex accumulator type, the basic features may be equally well applied to other forms of adding and calculating machines or to cash registering machines embodying one or more accumulators.

Figure 1:
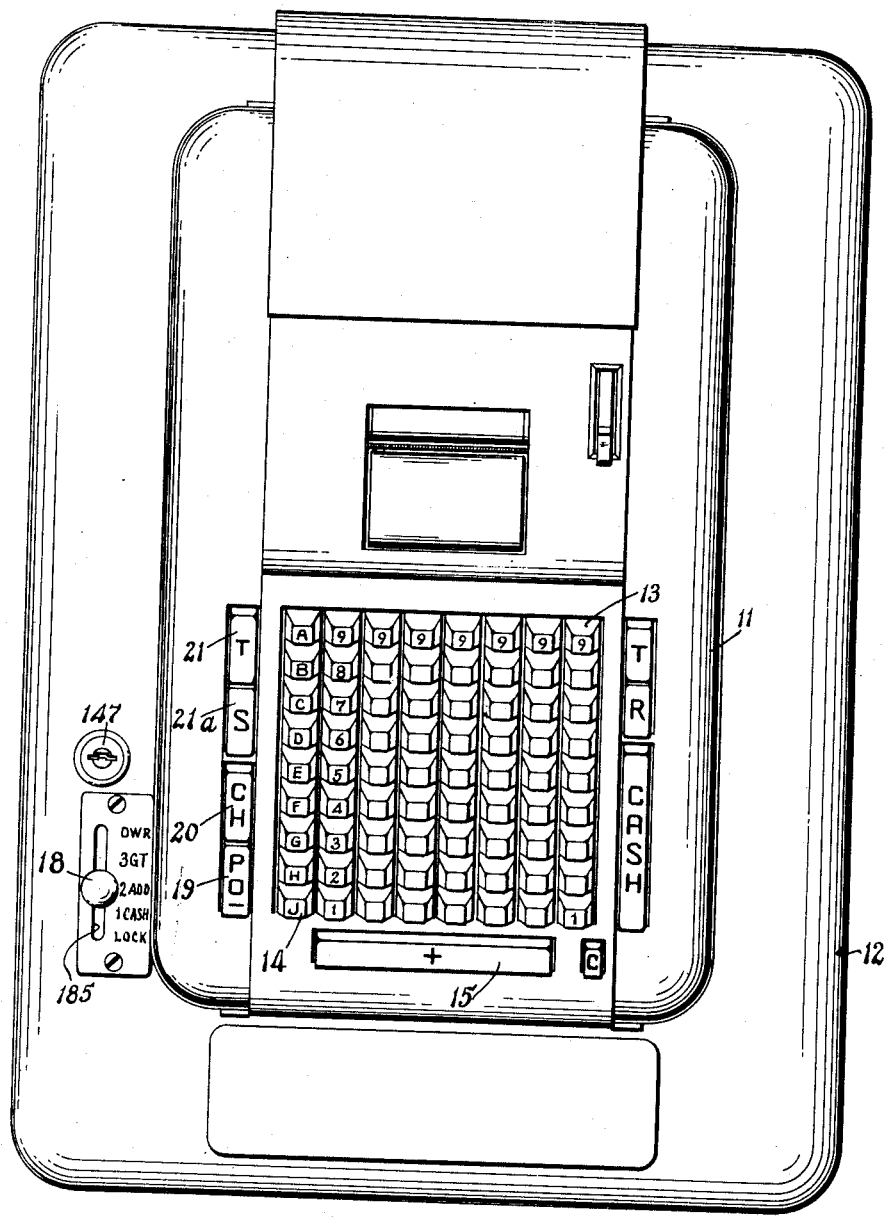
Fig. 1 is a plan view of a cash registering machine embodying the present invention.

The machine comprises in general a computing section enclosed by a cover 11 (Figs. 1 and 2) and a cash drawer section enclosed by a cover 12 (Figs. 1 and 3) underlying the computing section.

Amounts are entered into the machine through a keyboard comprising amount keys 13. The left hand row 14 in the keyboard is provided for designation purposes only and therefore amounts set therein are not accumulated.

An add bar 15 is provided to cause the machine to additively enter items set up on the keys 13 into one or the other or both of two accumulators generally indicated at A and B (Fig. 2) depending upon the presetting of a machine control knob 18 which is adjustable into any of five positions for controlling functioning of the machine in different desired manners. A subtract bar 19 is provided to cause the machine to subtract items entered in the keys 13 from a preselected accumulator. A non-add or charge bar 20 is provided to control printing only of items set in the keyboard. Total and sub-total bars 21 and 21a, respectively, are provided to total or sub-total items from one or the other of the two accumulators depending upon the setting of the knob 18.

As disclosed in the aforementioned Boyden patent, the computing mechanism is motor-driven and includes a cyclically operable drive shaft 22 (Figs. 2, 3 and 6), driven by a cyclic clutch (not shown) under control of the various control bars 15, 19, 20, 21 and 21a. Depression of any of said bars causes a cycle of operation of the machine, i. e., a complete rotation of the shaft 22.

The shaft 22 is effective, as will be described presently, to mesh one or the other or both of the accumulators A and B in different manners with differentially movable actuating racks 24 and 25, respectively (Fig. 2). The shaft 22 is also effective thereafter to differentially advance the racks until arrested by the stems of depressed ones of the amount keys and to release a cash drawer, partly illustrated at 26, permitting the latter to move from its illustrated "closed" position within the cover 12 when conditioned to do so by appropriate setting of the knob 18.

The upper racks 24 are provided with a series of shoulders 28, the shoulders being spaced apart distances slightly greater than the spacing between the stems of the amount keys 13 whereby when the racks are advanced until arrested by depressed ones of the amount keys they will move a number of increments equal to the values of the keys depressed. Normally, when no key in any one order is depressed, its associated racks 24 and 25 are prevented from movement by a zero stop 29 positioned directly in front of one of the shoulders 28. However, upon depression of a key 13 a cam lug (not shown) thereon will become effective to move the zero stop out of the way of the racks, permitting the same to be advanced until arrested by such depressed key.

The upper racks 24 are guided for fore and aft movement by a movable shaft 30 and a stationary shaft 31 extending through slots 32 and 33, respectively, formed in these racks. The lower racks 25 are similarly guided by two stationary shafts 34 and 35 embraced by slots 36 and 37, respectively, in each rack. The racks 24 and 25, in each order of the machine, are coupled together so as to move fore and aft as a unit by means of a plate 38 suitably secured to the lower rack 25 and provided with a pin and slot connection 39 with the upper rack 24.

For the purpose of differentially advancing the various pairs of racks 24 and 25, the shaft 30 is driven sideways, fore and aft of the machine, by the drive shaft 22 through drive means (not shown) and is yieldably connected to each rack by pairs of opposed drive elements 40 and 41. The latter are pivotally supported on the shaft 30 and are each provided with a roller 42 which normally engages a lateral depression formed in the closed end of the slots 32. A spring 43 is tensioned between the elements 40 and 41 to urge them apart and thus normally hold the rollers 42 thereof in the depressions until the respective rack is arrested by the zero stop 29 or by the stem of a depressed key 13, if such a key is depressed in the associated row of keys.

Each of the accumulators A and B (Fig. 2) comprises a series of ordinally arranged accumulator gears 44 rotatably mounted on an accumulator shaft 45 (associated with accumulator A) and shaft 46 (associated with accumulator B). Each accumulator gear 44 is arranged to mesh with the upper rack gear section 47 or lower rack gear section 48 of the associated rack and thereby enter amounts into the accumulator additively or subtractively. On the other hand, when the accumulator gears are positioned as illustrated in Fig. 2, movement of the racks will be ineffective to actuate such gears.

As disclosed in detail in the aforementioned Drake patent, each accumulator includes a second lower shaft 50 (Fig. 6) which together with its upper shaft 45 or 46 supports the accumulator as a unit for vertical movement. Each shaft is guided at the opposite ends thereof by suitable guideways (not shown) enabling the respective accumulator to move vertically into mesh with the upper or lower rack gear sections of the respective racks.

Referring to Fig. 6, the accumulator shaft 45 has rollers rotatably mounted on opposite ends thereof, one of which is shown at 51, and each is embraced in a cam groove 52 formed in a box cam, one of which is shown at 53, pivoted on a frame stud 54. Suitable means (not shown) are provided to transfer movement from the cam 53 at one end of the shaft 45 to the similar cam at the opposite end thereof whereby to effect parallel vertical movement of the accumulator.

Each of the accumulators is normally, i. e., when the machine is at rest, held in its neutral illustrated position wherein the gears thereof are located out of mesh with both rack gear sections 47 and 48 of the associated racks. For this purpose, the undersurface of the box cam 53 is provided with a V-shaped notch 55 normally engaged by a centralizer 56 fulcrumed at 57 and urged in engagement with the notch 55 by a spring 58. However, clockwise rocking of the cams 53 from their centralized positions will raise the accumulator to mesh with the upper rack gear section 47 to effect additive entries into the accumulator whereas counter-clockwise rocking movement of the cams will lower the accumulator into mesh with the lower rack gear sections 48 and thereby effect subtractive entries into the accumulator.

Describing now the means for raising and lowering the accumulators to selectively effect additive or subtractive entries therein, such means is precisely the same for both accumulators and, therefore, for the sake of brevity, only the mechanism associated with the upper accumlator will be described in detail.

The cam 53 has a pair of pins 60 and 61 extending therefrom on opposite sides of the pivot stud 54. These pins are adapted to be engaged by respective ones of two hooks 62 and 63 (see also Figs. 7, 8 and 10) pivotally mounted at 64 and 64a respectively, on an actuating slide 65. The hooks are normally held in an inffective position shown in Figs. 6 and 7 against pins 86 and 87 extending respectively from the links 82 and 83 by a spring 67 tensioned between the hooks.

The slide 65 is guided for fore and aft movement at the front by a stationary frame pin 68 embraced by an elongated slot in the slide. The rear of the slide 65 has an elongated slot embracing a pin 69 on a three-armed cam follower 70 pivotally mounted on the shaft 31. A strong tension spring 71 extends between the pin 69 and a pin 72 on the slide 65 so as to normally hold the pin 69 in engagement with the left-hand end of its embracing slot.

A spring 73 normally urges the cam follower 70 counterclockwise to hold a roller 74 thereof against the periphery of a cam 75 keyed on the aforementioned drive shaft 22.

The shaft 22 is rotated counter-clockwise, in the direction of arrow D, and it will therefore be seen that the cam 75 will be effective through the cam follower 70 to move the slide 65 rearward at the beginning of a machine cycle and will normally return the same to its forward illustrated position at approximately midway through the machine cycle. The slide 65a associated with the lower accumulator is moved in precisely the same manner as slide 65, and for this purpose the former is connected through a bell-crank 76, pivoted at 77, and a link 78 to the bell-crank 70. The slide 65a has an elongated slot embracing a pin 79 on the bell-crank 76 and is normally held in the position shown relative to the pin 79 by means of a strong tension spring 80 connected between the pin 79 and a similar pin 79a on the slide 65a.

Means are provided to selectively move one or the other of the hooks 62 and 63 outward into engagement with respective ones of the pins 60 and 61 during rearward movement of the slide 65 so as to rock the box cam 53 in one direction or the other and thereby raise or lower the accumulator.

A pair of juxtaposed accumulator control links 82 and 83 are located directly adjacent the hooks 62 and 63 for controlling the latter. The links have elongated slots at the rear thereof embracing a pin 84 extending from the slide 65, while elongated slots at the front of the links embrace and are guided by annular spacers 85 forming part of a control disc assembly generally indicated at 94. Pins 86 and 87 extend from the links 82 and 83, respectively, and normally lie directly behind camming shoulders 88 formed on the associated hooks. The forward ends of the links 82 and 83 are provided with oppositely extending ears 90 and 91, respectively, which are arranged to cooperate with aligned discs 92 and 93, respectively, of the control disc assembly 94. The discs have lobes, as at 95, located in different positions therearound which, when aligned with the ear of one of the links, will prevent the link from being moved along with its respective hook 62 or 63 as the slides 65 and 65a are moved rearward.

The control disc assembly comprises four notched discs 92, 93, 98 and 99 splined on a squared sleeve 100 which, in turn, is rotatably mounted on a frame pin 101. Annular spacers 85 are free to rotate on the sleeve 100. A washer 102 splined on the sleeve 100 is provided with an ear 66 positioned between two teeth of a gear 127, also mounted on the sleeve, thereby integrally connecting the gear to the sleeve.

When, for example, the disc assembly 94 is so positioned that the disc 92 will block the link 82 from moving rearward with its associated hook 62, the pin 86 will cam the latter hook outward into engagement with pin 60 as the slide 65 moves rearward. Further rearward movement of the slide 65 and hooks will therefore cause the hook 62 to rock the cam 53 into its extreme clockwise rocked position as illustrated in Fig. 10, thereby raising accumulator A into mesh with rack gear sections 47 of racks 24. Likewise, when the disc assembly 94 is so positioned as to block rearward movement of the link 83, it will cause the hook 63 to move outward to engage pin 61 and thus rock the cam 53 into an extreme clockwise rocked position to lower the accumulator into mesh with the rack gear sections 48 of the racks. On the other hand, when the disc assembly 94 is so positioned that it will not block either links 82 or 83 from movement, neither of the hooks will be moved outward during rearward movement thereof and, therefore, the accumulator will remain in its neutral or "non-add" position during operation of the racks.

Referring to Fig. 6, it will be noted that shoulders 183 and 184 are formed on slide 65 directly in the rear of pins 60 and 61 on the cam 53. Therefore, on forward movement of the slide 65, one or the other of said shoulders will engage its associated pin and thereby return the cam 53, and consequently the accumulator, to its neutral position if the accumulator had previously been raised or lowered.

Control of the hooks 62a and 63a associated with the lower accumulator is accomplished in precisely the same manner as the corresponding hooks 62 and 63 through links 96 and 97 under control of discs 98 and 99, respectively, also forming part of the control disc assembly 94.

From the foregoing, it will be seen that although the control links, i. e., 82 and 83, for controlling entry into any one accumulator are either blocked from moving or are allowed to move by their respective control discs, they are nevertheless capable of controlling setting of the accumulator into any of three different conditions, i. e., add, subtract and non-add, relative to the actuator racks.

The control disc assembly 94 is rotatable into different angularly arranged positions to accordingly select either or both or neither accumulator for digitation and for determining the type of operation. For this purpose, the control disc assembly is rotated jointly under control of the machine control knob 18 and the various control bars 15, 19, 20, 21 and 21a.

Describing first the control of the disc assembly by the various control bars, the bars 19 to 21a, inclusive, guided for vertical movement in slots formed in spaced keyboard frame plates 101 and 102 (Fig. 6A). The stem of each control bar overlies a pin 103 carried on an arm 104 which is pivoted on a stationary frame stud 105 and is normally held in a raised position as illustrated in Fig. 6A by a tension spring 106 extending between the pin 103 and a frame stud 107, thus likewise holding the associated control bar in raised position. The pins 103 overlie cooperating camming surfaces 108 formed on an accumulator control slide 109. The latter is provided with elongated guide slots 110 and 111 embracing and guided by the frame studs 105 associated with the subtract and total keys 19 and 21, respectively.

The add bar 15 (Fig. 6A) is likewise suitably guided for vertical movement and the stem thereof is connected through a pin and slot connection 112 to an arm 113 fixed on a rockable shaft 114 (Fig. 6) having a stud 116 which cooperates with a camming surface 117 on slide 109.

Depression of the add bar 15 is effective to move the slide 109 into an extreme rearmost position. The various other control bars 19 to 21a are, on the other hand, effective to differentially advance the slide 109 forwardly to different positions.

The slide 109 has a rack gear section 120 thereon meshing with an idler 121 rotatably mounted on a pin 122 carried by a slide 123. The latter has elongated slots thereon embracing and guided by frame studs 124. The pinion 121 also meshes with a rack 125 having elongated slots also guided over the frame studs 124 independently of the slide 123. Therefore, considering for the moment the slide 123 to be held stationary, any movement of the slide 109 will be transmitted through pinion 121 to the rack 125. The latter has a rack gear section 126 meshing with the gear 127 (see also Fig. 8) which is attached to the sleeve 180 of the control disc assembly 94. Consequently, depression of different ones of the various control bars will effect rotation of the control disc assembly into different angular positions relative to the various control links.

Means are provided under control of the control knob 18 (Figs. 1, 3 and 4) for differentially setting the control disc assembly 94 jointly with the aforementioned control thereof by the different depressible control bars 15 to 21a. For this purpose, the control knob 18 is operatively connected to the slide 123 whereby shifting of the knob into its different positions causes movement of the pinion 121 fore and aft along the slide 109 to accordingly set the slide 125 and disc assembly 94.

The slide 123 is coupled through a pin and slot connection 128 to a control lever 129 pivoted on a frame stud 130. The lever 129 is normally held against a pin 131 carried on a lever 132 by a spring 133 tensioned between these two levers. The lever 132 is pivoted on a frame pin 134 and is urged by a spring 135 to hold its pin 131 against the surface of a step cam 136. The latter has slots guided over frame studs 137 and is connected through a pin and slot arrangement 138 (see also Figs. 3 and 4) to a slide 139. The control knob 18 extends through a slot 185 in the casing 12 and is suitably secured to an extension 140 of the slide 139. The latter is guided by frame pins 141 and 142 extending through elongated slots in the slide, permitting manual setting of the slide into any of four positions and movement thereof into any of five positions.

The slide 139, and consequently slide 123 (Fig. 6), is centralized in any of four positions by a centralizer 143 pivoted at 144 and urged downwardly by a spring 145 tensioned between the centralizer and a suitable part of the frame to urge the centralizer into engagement with one of four equally spaced V-shaped centralizing notches 146 on the slide 139.

A key lock general indicated at 147 (Figs. 3, 4 and 5) is provided to selectively lock the control knob 118 and slide 139 in any set position, i. e., "Lock," "Cash," "Add" or "GT." The lock 147 is mounted on the casing 12 and has a lock arm 148 extending therefrom. The lock arm 148 normally extends toward the rear of the machine as indicated in Fig. 3 in which position it is ineffective to engage the centralizer 143. However, upon turning of the lock into locking condition, the arm is swung laterally into the position indicated in Fig. 5 wherein it overlies the centralizer 143 so as to prevent the same from being raised upon attempted movement of the knob 18.

Figure 12:
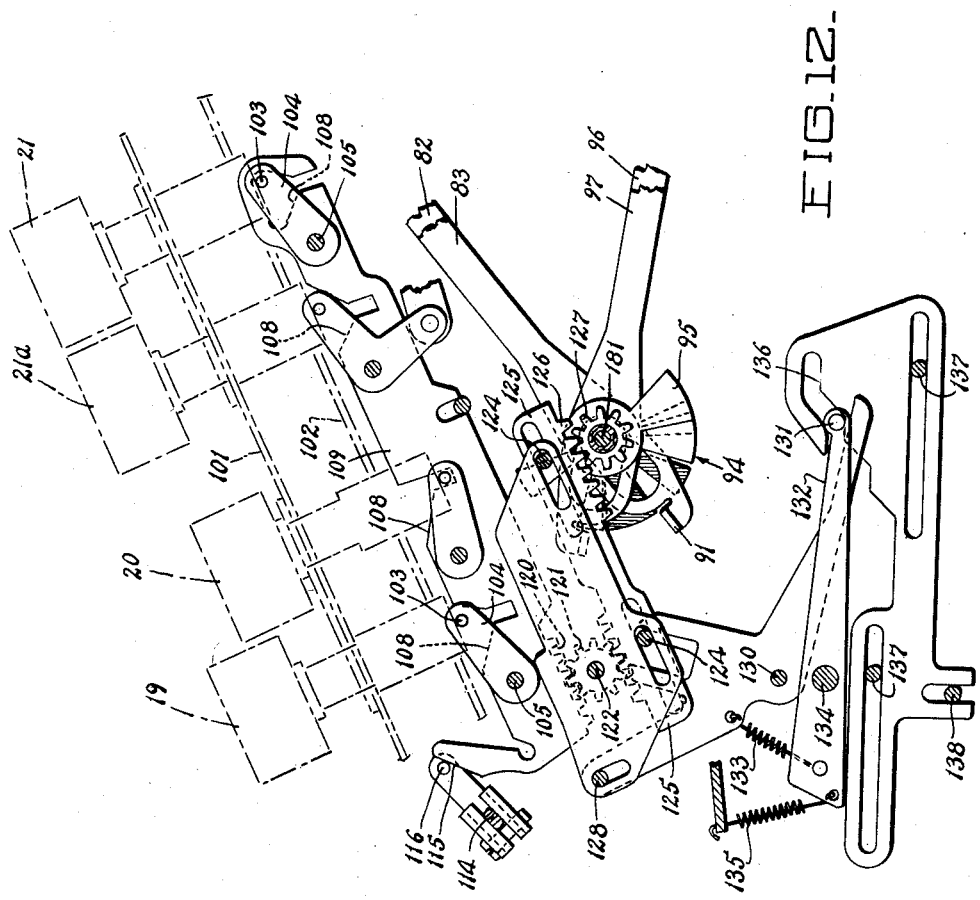
Fig. 12 is a sectional elevation view similar to Fig. 6 but with parts broken away, illustrating the machine control knob in a "cash" setting and with the charge key depressed.

From the foregoing, it will be seen that the slide 125 and, consequently, the control disc assembly may be set under joint control of the control knob 18 and control bars into different selected positions. For example, Fig. 12 shows the positions of the rack 125 and control disc assembly 94, resulting from setting of the knob 18 in its "cash" position and from depression of the charge bar 20.

Fig. 11 illustrates diagrammatically the relationship between the various control discs 92, 93, 98 and 99 and their respective control links 82, 83, 96 and 97 effected by different settings of the knob 18 and depression of different control bars. The figure illustrates developed views of the control discs formed according to the present disclosure. Also, the figure illustrates the relative settings of the discs and control links with the control knob 18 set in "add" position and with the add bar depressed. It will be noted that in this relative setting only the link 82 associated with the accumulator A will be blocked by the lobe 95 of its associated control disc 92 whereas the remaining links will be permitted to move completely through their strokes. Accordingly, as aforementioned, the accumulator A (under control of discs 92 and 93) will be positioned to receive an additive entry.

As examples of various other conditions into which the machine may be arranged, setting of the knob 18 into "GT" position and depression of the add bar will effect a relative positioning of the links and discs according to the condition indicated by the line 149 in which case entry would be made additively into accumulator B only. Setting of the knob 18 in its "cash" position and depression of the paid out key (PO) would affect the relative positioning of the links and control discs according to the line 149a to effect a subtractive entry into the accumulator A only.

It will be seen that by reforming or replacing the various control discs with other shaped discs that various other combinations of controls may be affected to add or subtract out of either one or both accumulators or to total or sub-total out of either of the accumulators under control of the knob 18 and the different control bars.

As mentioned hereinbefore, the present machine is of the cash register type and the settable knob 18 in addition to preselecting the different accumulators for operation, is also effective to control the cash drawer to accommodate different conditions of use to which the machine may be put.

The drawer as disclosed in detail in the aforementioned Boyden et al, application, S. N. 38,294, and as partially indicated at 26 in Fig. 3, is suitably mounted in the cash drawer casing 12 for movement to and from an open position. Spring means (not shown) are provided to yieldably urge the drawer toward its open position. However, the drawer is normally held in its illustrated closed position by a latch 150 (Figs. 3, 4 and 9) pivotally supported at 151 on a bracket depending from a frame 152 forming the base for the computing section of the machine and integral with the casing 12. The latch 150 is normally held in its illustrated position in latching engagement with the rear wall of the drawer 26 by a spring 153 extending between a portion of the machine frame (not shown) and a pin 154 carried on an arm 155 also pivoted at 151 independently of the latch 150. The pin 154 normally rests against a shoulder 156 on the latch to yieldably hold the same in its illustrated latching position.

The arm 155 is engaged by a roller 157 on the lower end of a lever 158 which is pivotally mounted at 159 and is provided with a roller at the upper end thereof engaging the periphery of a drawer release cam 160 mounted on the aforementioned drive shaft 22.

Upon cycling of the machine, the cam 160 will rock cam follower 158 counter-clockwise to actuate arm 155. The latter is connected through a spring 161 to the latch 150 and thereby normally actuates the latter to release the drawer, unless the latch is blocked by other means to be described presently.

In some instances it is desirable to maintain the drawer 26 in closed condition throughout a machine operation such as when the control knob 18 is set in "add" position for adding or subtracting items without cash transactions. For this purpose, means under control of the knob 18 are provided to block release of the latch 150 by the cam 160. A cross slide 162 (Figs. 3, 4 and 9) is provided having elongated slots 163 guided over guide studs 164 fixed to the bottom of the frame 152. The slide 162 has a pin 165 therein extending upwardly through a slot 166 in the frame 152 and coupled through a pin and slot connection to a bell-crank 167. The latter is pivoted at 167a and is coupled through pin and slot connection 168 to the aforementioned knob controlled slide 139.

Figs. 4 and 9 illustrate the parts in positions located by setting the control knob 18 in its "add" position, and in such position a blocking lug 169 depending from the slide 162 is located over the latch 150. Operation of the machine with the slide 162 in this position will cause the spring 161 to yield during movement of the lever 158 and arm 155 by the cam 160 and, therefore, the drawer will be retained in closed position. A second blocking lug 170 is located on the slide 162 in such a position that when the control knob 18 is moved to its "lock" position, the latter lug will be located over the latch 150 to likewise prevent movement thereof to drawer releasing position. However, upon movement of the knob 18 to "cash" or "GT" positions, both blocking lugs 169 and 170 will be moved out of registry with the latch 150, permitting operation of the cam 160 to move the latch to drawer releasing position. On the other hand, movement of the knob 18 to its "drawer" position will cause a camming lug 172 on the cross slide 162 to engage a lug 173 on the latch 150 and directly raise the latter to its drawer releasing position without operating the machine.

Although we have described our invention in detail in its preferred form and therefore have utilized certain specific terms and languages herein, it is to be understood that the present disclosure is illustrative rather than restrictive and that changes and modifications may be made without departing from the spirit or scope of the claims appended hereto. For example, control of various other forms of control discs having differentially positioned lobes thereon may be substituted to effect various desired functions of the machine.

Having thus described the invention, what we desire to secure by United States Letters Patent, is:

1. In a calculating machine having an accumulator and differential actuators therefor; the combination comprising means for operatively connecting said accumulator to said actuators including a control element movable between a first position and a second position, actuating means, a coupling member operable by said actuating means and adapted to move said control element from said first position to said second position, said coupling member being normally out of coupling relation with said control element, a camming device engageable with said control element and adapted upon relative movement between said camming device and said coupling member to cam said coupling member into coupled relation with said control element, means for normally causing said camming device to move with said control element, and means for selectively causing said relative movement between said camming device and said coupling member.

2. In a calculating machine having an accumulator and differential actuators therefor; the combination comprising means for operatively connecting said accumulator to said actuators including a control element movable from a first position to a second position, actuating means, a coupling member operable by said actuating means and adapted to move said control element from said first position to said second position, said coupling member being normally out of coupled relation with said control element, a camming device engageable with said control element and adapted upon relative movement between said camming device and said coupling member to cam said coupling member into coupled relation with said control element, means including a spring carried by said actuating means for normally causing said camming device to move with said coupling element, and means for selectively arresting said camming device.

3. In a calculating machine having an accumulator and differential actuators therefor; the combination comprising means for operatively connecting said accumulator to said actuators including a control element movable from a first position to a second position, a reciprocally operable actuating means, a coupling member operable by said actuating means and adapted upon movement of said actuating device in one direction to move said control element from said first position to said second position, said coupling member being normally out of coupled relation with said control element, a camming device engageable with said control element and adapted upon relative movement between said camming device and said coupling member to cam said coupling member into coupled relation with said control element, means including a spring carried by said actuating means for normally causing said camming device to move with said coupling element, means for selectively arresting said camming device, and means invariably actuated by said actuating means during return movement thereof in the opposite direction for returning said control member from said second position to said first position.

4. In a calculating machine having an accumulator and differential actuators therefor; the combination comprising means for operatively connecting said accumulator to said actuators including a control element movable from a first position to a second position, actuating means, a coupling member operable by said actuating means and adapted to move said control element from said first position to said second position, said coupling member being normally uncoupled from said control element, an engaging device adapted upon relative movement between said device and said coupling member to move said coupling member into coupled relation with said control element, spring means for normally causing said engaging device to move with said coupling member, and selectively settable means for arresting movement of said engaging device whereby to cause said engaging device to move said coupling member into coupled relation with said control element.

5. In a calculating machine having an accumulator and differential actuators therefor; the combination comprising means for operatively connecting said accumulator to said actuators including a control element movable from a first position to a second position, reciprocatory actuating means, a coupling member operable by said actuating means during movement of said actuating means in one direction and adapted to move said control member from said first position to said second position, said coupling member being normally uncoupled from said control member, an engaging device adapted upon relative movement between said device and said coupling member to move said coupling member into coupled relation with said control member, spring means for normally causing said engaging device to move with said coupling member, selectively settable means for arresting movement of said engaging device, and means responsive to movement of said actuating means in the opposite direction for causing said coupling member to move into uncoupled relation with said control member.

6. In a calculating machine having an accumulator and differential actuators therefor; the combination comprising means for operatively connecting said accumulator to said actuators including a control element movable from a first position to a second position, actuating means, a coupling member operable by said actuating means and adapted to move said control member from said first position to said second position, said coupling member being normally uncoupled from said control member, an engaging device adapted upon relative movement between said device and said coupling member to move said coupling member into coupled relation with said control element, spring means for normally causing said engaging device to move with said coupling member, a notched control member adapted upon setting thereof into different positions to arrest or to permit movement of said engaging device, and key controlled means for selectively setting said control member into different ones of said positions thereof.

7. In a calculating machine having an accumulator and differential actuators therefor; the combination comprising means for operatively connecting said accumulator to said actuators including a control element movable from a first position to a second position, actuating means, a coupling member operable by said actuating means and adapted to move said control element from said first position to said second position, a camming member cooperable with said coupling member, spring means for normally maintaining said coupling member out of cooperative relation with said control element, said spring means being effective to normally cause said camming member to move with said coupling member, and means for selectively arresting said camming member from movement, said camming member being operable upon arresting thereof to cam said coupling member into cooperative relation with said control member during operation of said actuating means.

8. In a calculating machine having an accumulator and differential actuators therefor; the combination comprising means for operatively connecting said accumulator to said actuators including a control element movable from a first position to a second position, actuating means, a coupling member operable by said actuating means and adapted to move said control element from said first position to said second position, a camming member cooperable with said coupling member, spring means for normally maintaining said coupling member out of cooperative relation with said control element, said spring means being effective to normally cause said camming member to move with said coupling member, a notched control member adapted upon setting thereof into different ones of a plurality of positions to arrest or permit movement of said camming member, and means comprising a plurality of depressible keys for selectively setting said control member into any of said positions thereof.

9. In a calculating machine having reversible accumulator elements and differential actuators therefor; the combination comprising means for operatively connecting said accumulator elements to said actuators including a control element settable into a first position for relatively adjusting said actuators and said accumulator elements to permit driving of the latter in an additive direction, said control element being settable into a second position for relatively adjusting said actuators and said accumulator elements to permit driving of the latter in a subtractive direction, a pair of coupling members adapted to engage said control element whereby to actuate the same, means for concomitantly actuating said coupling members, one of said coupling members being adapted to set said control element in said first position, the other of said coupling members being adapted to set said control element in said second position, camming members engageable with respective ones of said coupling members and adapted upon relative movement between each camming member and its respective coupling member to cam the latter into coupled relation with said control element, means normally causing said camming members to move with said coupling members, and means for selectively arresting said camming members.

10. In a calculating machine having reversible accumulator elements and differential actuators therefor; the combination comprising means for operatively connecting said accumulator elements to said actuators including a control element settable into a first position for relatively adjusting said actuators and said accumulator elements to permit driving of the latter in an additive direction, said control element being settable into a second position for relatively adjusting said actuators and said accumulator elements to permit driving of the latter in a subtractive direction, a pair of coupling members adapted to engage said control element whereby to actuate the same, means for actuating said coupling members, one of said coupling members being adapted to set said control element in said first position, the other of said coupling members being adapted to set said control element in said second position, a pair of camming devices individual to said coupling members and adapted upon relative movement between the same and said coupling members to cause engagement of said coupling members with said control element, a plurality of control keys, and means controlled by said keys for selectively arresting one or the other of said camming devices whereby to cause engagement of the respective coupling member.

11. In a calculating machine having reversible accumulator elements and differential actuators therefor; the combination comprising means for operatively connecting said accumulator elements to said actuators including a control element settable into a first position for relatively adjusting said actuators and said accumulator elements to permit driving of the latter in an additive direction, said control element being settable into a second position for relatively adjusting said actuators and said accumulator elements to permit driving of the latter in a subtractive direction, a pair of coupling members adapted to engage said control element whereby to actuate the same; means for actuating said coupling members, one of said coupling members being adapted to set said control element in said first position, the other of said coupling members being adapted to set said control element in said second position, a pair of camming devices individual to said coupling members and adapted upon relative movement between the same and said coupling members to cause engagement between said coupling members and said control element, a plurality of control keys, and means responsive to depression of certain of said keys for causing operation of said actuating means and for preventing movement of one or another of said camming devices.

12. In a calculating machine having reversible accumulator elements and differential actuators therefor; the combination comprising means for operatively connecting said accumulator elements to said actuators including a control element settable into a first position for relatively adjusting said actuators and said accumulator elements to permit driving of the latter in an additive direction, said control element being settable into a second position for relatively adjusting said actuators and said accumulator elements to permit driving of the latter in a subtractive direction, a pair of coupling members adapted to engage said control element whereby to actuate the same, means for actuating said coupling members, one of said coupling members being adapted to set said control element in said first position, the other of said coupling members being adapted to set said control element in said second position, a pair of camming devices individual to said coupling members and adapted upon relative movement between the same and said coupling members to cause engagement between said coupling members and said control element, a notched control member adapted upon setting thereof into any of a plurality of positions to prevent or permit movement of one or the other of said camming devices relative to said coupling members, and means for selectively setting said control element into any of said positions thereof.

13. In a calculating machine having reversible accumulator elements and differential actuators therefor; the combination comprising means for operatively connecting said accumulator elements to said actuators including a control element settable into a first position for relatively adjusting said actuators and said accumulator elements to permit driving of the latter in an additive direction, said control element being settable into a second position for relatively adjusting said actuator and said accumulator elements to permit driving the latter in a subtractive direction, said control element being settable into a third position for preventing driving said accumulator elements by said actuators, a pair of coupling members adapted to engage said control element, an actuating device for said coupling members, one of said coupling members being adapted to move said control element from said third position to said first position during movement of said actuating device in one direction, the other of said coupling members being adapted to move said control element from said third position to said second position during said movement of said actuating device, a pair of camming devices individual to said coupling members and adapted upon relative movement between said camming devices and respective ones of said coupling members to cause engagement of the latter with said control member, spring means for normally maintaining said coupling members disengaged from said control member and for causing said camming devices to move with said coupling members, a notched control member adapted upon setting thereof into different positions to arrest or to permit movement of one or the other of said camming devices, and means for selectively setting said control member into different ones of said positions thereof.

14. In a calculating machine having reversible accumulator elements and differential actuators therefor; the combination comprising means for operatively connecting said accumulator elements to said actuators including a control element settable into a first position for relatively adjusting said actuators and said accumulators elements to permit driving of the latter in an additive direction, said control element being settable into a second position for relatively adjusting said actuator and said accumulator elements to permit driving the latter in a subtractive direction, said control element being settable into a third position for preventing driving said accumulator elements by said actuators, a pair of coupling members adapted to engage said control element, a reciprocable actuating device for said coupling members, one of said coupling members being adapted to move said control element from said third position to said first position during movement of said actuating device in one direction, the other of said coupling members being adapted to move said control element from said third position to said second position during said movement of said actuating device, a pair of camming devices individual to said coupling members and adapted upon relative movement between said camming devices and respective ones of said coupling members to cause engagement of the latter with said control member, means for selectively permitting or preventing movement of said camming devices, and means on said actuating device adapted to return said control member to said third position during movement of said actuating device in the opposite direction.

15. In a calculating machine having an accumulator and differential actuators therefor; the combination comprising means for operatively connecting said accumulator to said actuators including a control element movable from a first position to a second position, actuating means, a coupling member operable by said actuating means and adapted to move said control element from said first position to said second position, said coupling member being normally operatively disengaged from said control member, an engaging device adapted upon relative movement between said device and said coupling member to move said coupling member into operative engagement with said control element, means for normally causing said engaging device to move with said coupling member, a notched control element adapted upon setting thereof into different ones of a plurality of different positions to arrest or permit movement of said engaging device, two independently movable adjusting devices, means for differentially adjusting said adjusting devices, and means differentially settable by both of said adjusting devices for setting said control element into any of said positions thereof.

16. In a calculating machine having reversible accumulator elements and differential actuators therefor; the combination comprising means for operatively connecting said accumulator elements to said actuators including a control element settable into a a first position for relatively adjusting said actuators and said accumulator elements to permit driving of the latter in an additive direction, said control element being settable into a second position for relatively adjusting said actuators and said accumulator elements to permit driving of the latter in a subtractive direction, a pair of coupling members adapted to engage said control element whereby to actuate the same, means for actuating said coupling members, one of said coupling members being adapted to set said control element in said first position, the other of said coupling members being adapted to set said control element in said second position, a pair of camming devices individual to said coupling members and adapted upon relative movement between the same and said coupling members for causing engagement between said coupling members and said control member, a notched control element adapted upon setting thereof into different ones of a plurality of positions to arrest or permit movement of one or the other of said camming devices, two independently movable adjusting devices, means for differentially adjusting each of said adjusting devices, and means differentially settable by both of said devices for setting said control element into any of said positions thereof.

17. In a calculating machine having a plurality of accumulators and differential actuators therefor; the combination comprising means for operatively connecting said accumulators to said actuators including a plurality of control elements for respective ones of said accumulators, each of said control elements being movable from a first position to a second position to operatively connect its respective accumulator to said actuators, actuating means, a plurality of coupling members operable by said actuating means and adapted to move respective ones of said control elements from said first positions to said second positions thereof, a plurality of camming members cooperable with respective ones of said coupling members, spring means for normally maintaining said coupling members out of cooperative relation with said control elements, said spring means being effective to normally cause said camming members to move with said coupling members, said camming members being operable upon arresting thereof to cam said respective coupling members into cooperative relation with said respective control members during operation of said actuating means, a notched control element adapted upon setting thereof into different positions to arrest or permit movement of one or another of said camming members.

18. In a calculating machine having a plurality of accumulators and differential actuators therefor; the combination comprising means for operatively connecting said accumulators to said actuators including a plurality of control elements for respective ones of said accumulators, each of said control elements being movable from a first position to a second position to operatively connect its respective accumulator to said actuators, reciprocatory actuating means, a plurality of coupling members operable by said actuating means and adapted during movement of said actuating means in one direction to move said respective ones of said control elements from said first position to said second positions thereof, means normally maintaining said coupling members out of cooperative relation with said control member, devices individual to said coupling members and responsive to actuation of said coupling members by said actuating means for causing engagement thereof with said respective control members, an element common to all of said devices and selectively settable to enable or disable one or another of said devices, and means invariably actuated by said actuating means during movement thereof in the opposite direction for returning any of said control members which are in said second position thereof to said first position thereof.

WHARTON A. PARSONS.
RICHARD E. BUSCH.

References Cited in the file of this patent

UNITED STATES PATENTS

| Number | Name | Date |
|---|---|---|
| 1,048,249 | White | Dec. 24, 1912 |
| 1,908,358 | Horton | May 9, 1933 |
| 2,110,987 | Kammel | Mar. 15, 1938 |
| 2,118,588 | Butler | May 24, 1938 |
| 2,203,533 | Landsiedel | June 4, 1940 |
| 2,376,481 | Gubelmann | May 22, 1945 |